US012616158B2

(12) United States Patent
Anglart et al.

(10) Patent No.: US 12,616,158 B2
(45) Date of Patent: May 5, 2026

(54) QUALITY SENSOR, COMPUTER-IMPLEMENTED METHOD OF PREDICTING INHOMOGENEITIES IN MILK EXTRACTED FROM AN ANIMAL, COMPUTER PROGRAM AND NON-VOLATILE DATA CARRIER

(71) Applicant: DELAVAL HOLDING AB, Tumba (SE)

(72) Inventors: Dorota Anglart, Tumba (SE); Charlotte Hallén Sandgren, Tumba (SE)

(73) Assignee: DeLaval Holding AB, Tumba (SE)

( * ) Notice: Subject to any disclaimer, the term of this patent is extended or adjusted under 35 U.S.C. 154(b) by 377 days.

(21) Appl. No.: 18/261,389

(22) PCT Filed: Jan. 14, 2022

(86) PCT No.: PCT/SE2022/050044
§ 371 (c)(1),
(2) Date: Jul. 13, 2023

(87) PCT Pub. No.: WO2022/154743
PCT Pub. Date: Jul. 21, 2022

(65) Prior Publication Data
US 2024/0074400 A1 Mar. 7, 2024

(30) Foreign Application Priority Data
Jan. 15, 2021 (SE) .................................... 2150028-5

(51) Int. Cl.
*A01J 5/01* (2006.01)
*A01J 9/02* (2006.01)
(Continued)

(52) U.S. Cl.
CPC . *A01J 5/01* (2013.01); *A01J 9/02* (2013.01); *G06T 7/0004* (2013.01);
(Continued)

(58) Field of Classification Search
CPC ......................................................... A01J 5/01
See application file for complete search history.

(56) References Cited

U.S. PATENT DOCUMENTS

| | | | |
|---|---|---|---|
| 8,261,597 B2 | 9/2012 | Wiethoff et al. |
| 2011/0308627 A1 | 12/2011 | Loosveld et al. |
| 2019/0254249 A1 | 8/2019 | Caamaño Fernandez et al. |

FOREIGN PATENT DOCUMENTS

| | | |
|---|---|---|
| EP | 1264537 A1 | 12/2002 |
| EP | 1273224 A1 | 1/2003 |

(Continued)

OTHER PUBLICATIONS

International Search Report for PCT/SE2022/050044 mailed May 3, 2022, 5 pages.
(Continued)

*Primary Examiner* — Walter L Lindsay, Jr.
*Assistant Examiner* — Andrew V Do
(74) *Attorney, Agent, or Firm* — NIXON & VANDERHYE

(57) ABSTRACT

A quality sensor that predicts a degree of inhomogeneities in milk extracted from an animal, by receiving a set of input variables reflecting at least one characteristic each of the animal, the extracted milk, and at least process during which milk was extracted from the animal, and by feeding the input variables into a trained artificial neural network in the quality sensor, which generates an estimate of a predicted degree of inhomogeneities in the milk of the animal.

15 Claims, 2 Drawing Sheets

(51) Int. Cl.
   _G06T 7/00_         (2017.01)
   _G06V 10/764_      (2022.01)
   _G06V 10/82_        (2022.01)
   _A01K 29/00_           (2006.01)

(52) U.S. Cl.
   CPC ............ _G06V 10/764_ (2022.01); _G06V 10/82_
                 (2022.01); _A01K 29/005_ (2013.01); _G06T_
                 _2207/20084_ (2013.01); _G06T 2207/30128_
                                             (2013.01)

(56)                     References Cited

FOREIGN PATENT DOCUMENTS

| | | | | |
|---|---|---|---|---|
| WO | 2004073391 | A1 | 9/2004 | |
| WO | WO-2007089184 | A1 * | 8/2007 | ............ G06Q 50/02 |
| WO | 2014083433 | A2 | 6/2014 | |
| WO | 2018111093 | A1 | 6/2018 | |
| WO | 2018111094 | A1 | 6/2018 | |

OTHER PUBLICATIONS

Written Opinion of the ISA for PCT/SE2022/050044 mailed May 3, 2022, 7 pages.
Swedish Search Report for SE2150028-5 completed Aug. 25, 2021, 2 pages.

* cited by examiner

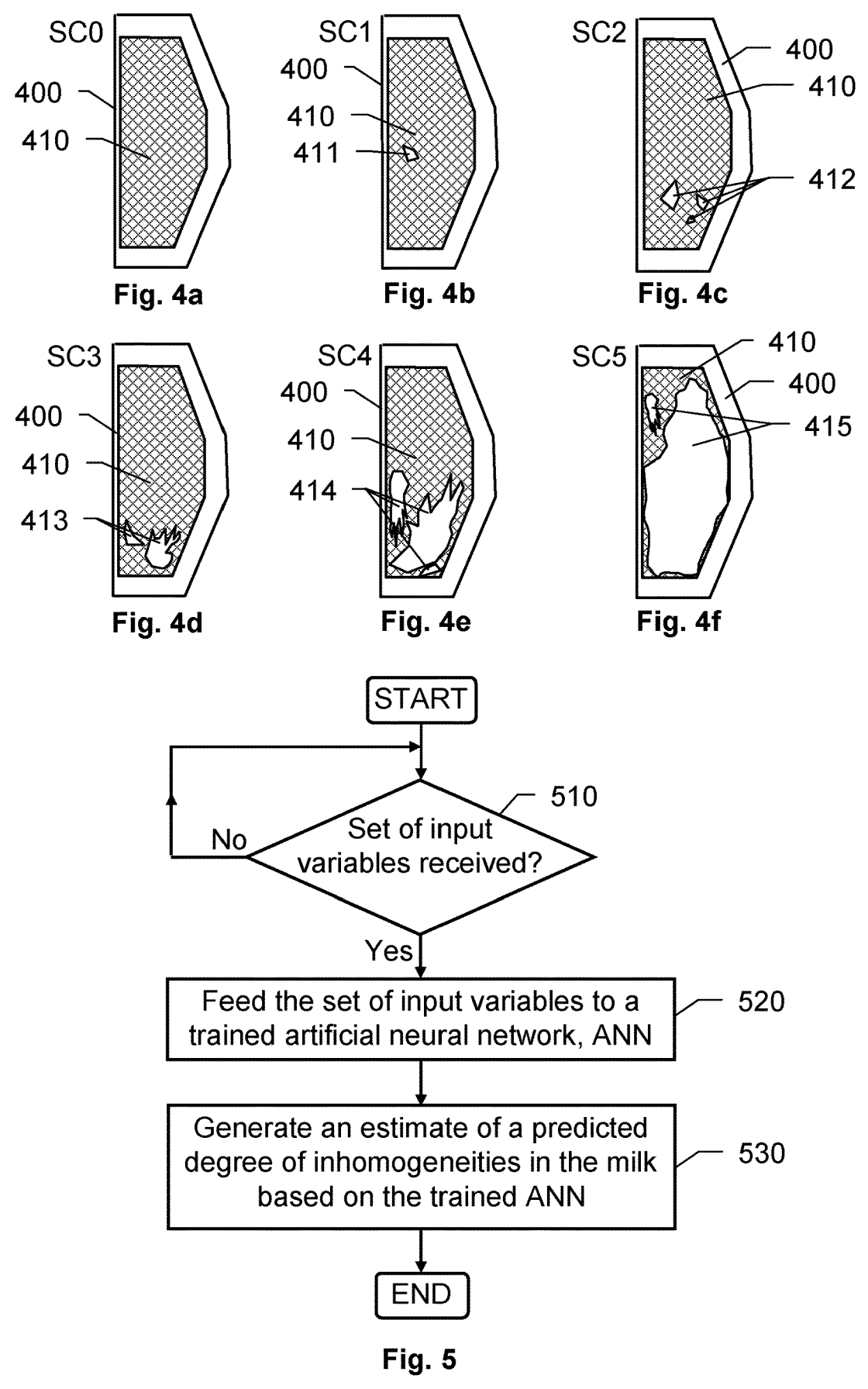

START

510 Set of input variables received?

No

Yes

Feed the set of input variables to a trained artificial neural network, ANN — 520

Generate an estimate of a predicted degree of inhomogeneities in the milk based on the trained ANN — 530

END

Fig. 5

QUALITY SENSOR, COMPUTER-IMPLEMENTED METHOD OF PREDICTING INHOMOGENEITIES IN MILK EXTRACTED FROM AN ANIMAL, COMPUTER PROGRAM AND NON-VOLATILE DATA CARRIER

CROSS-REFERENCE TO RELATED APPLICATIONS

This application is the U.S. national phase of International Application No. PCT/SE2022/050044 filed Jan. 14, 2022, which designated the U.S. and claims priority to SE 2150028-5 filed Jan. 15, 2021, the entire contents of each of which are hereby incorporated by reference.

TECHNICAL FIELD

The present invention relates generally to milk quality monitoring. Especially, the invention relates to a quality sensor for predicting inhomogeneities in the milk extracted from an animal and a corresponding computer-implemented method. The invention also relates to a computer program and a non-volatile data carrier storing such a computer program.

BACKGROUND

For health and hygienic reasons it is important that a dairy farmer has accurate and reliable information about the milk being produced at his/her facilities. Moreover, various regulatory frameworks demand that the milk placed on the consumer market meets certain quality standards. For example, milk extracted from animals with udder inflammation cannot be used in food production. However, there are few methods for generating predictions of generally accepted indicators of udder inflammation and poor milk quality, such as somatic cell count (SCC) or changes in milk homogeneity.

Traditionally, in manual milking, the milker pre-strips each quarter of the animal's udder and inspects the stripped milk before attaching the milking unit. During the inspection, the milker looks for deviations in the milk quality, such as clots, color changes, or other abnormalities. Thereby, the milker may identify sick cows and prevent abnormal milk from ending up in the bulk tank. In addition, regular milk samplings are typically performed in which the levels of somatic cells (i.e. white blood cells) are measured to monitor the udder health as well as milk quality.

Of course, the above visual inspection cannot be made in automatic milking systems, such as milking robots, where the cows are milked on a voluntary basis. Here, some of said quality aspects may be measured by sensors, for example electric conductivity and color.

However, it is challenging to automatically detect other kinds of deviations, such as milk clots, the presence of which is positively correlated with mastitis (udder inflammation).

EP 1 264 537 discloses a method and a device for selecting milk. Here, within a predetermined period of time, a flow of milk is guided into a measuring chamber with at least one filter and a detector unit. After the predetermined period of time, the flow of milk is guided past the measuring chamber in a bypass line. After the predetermined period of time, a surface of the filter is detected. Depending on the evaluation result of the detection, the milk flow is either directed to a collecting container for usable milk or discarded.

EP 1 273 224 describes a solution wherein, for the selection of milk, a predetermined milk volume of a milk flow is introduced into a measuring chamber with at least one detector unit. At least one area of the bottom surface of the measuring chamber is then detected, the detection is evaluated and, depending on the evaluation result, the milk flow either being directed to the collecting container for usable milk or being discarded.

Thus, the known solutions basically mimic the milker's visual inspection described above. This strategy has proven to be both time consuming and unreliable. More important, the milk quality from a particular animal cannot be predicted before the milk extraction has been initiated. Consequently, there is a risk that substandard milk enters the bulk tank even if the detector signals a quality-related problem.

SUMMARY

The object of the present invention is therefore to offer a solution that solves the above problem and enables efficient and reliable prediction of inhomogeneities, for instance in the form of so-called clots in the milk to be extracted from a particular animal, or in the milk that is currently being extracted from this animal.

According to one aspect of the invention, the object is achieved by a quality sensor for predicting inhomogeneities in milk extracted from an animal. The quality sensor is configured to receive a set of input variables reflecting at least one characteristic of the animal as such; at least one characteristic of the milk extracted—in the present milking session, in at least one earlier milking session, or both; and at least one characteristic of at least one process during which milk was extracted from the animal—i.e. the present milking session, at least one earlier milking session, or both. The quality sensor is further configured to feed the set of input variables into a trained artificial neural network. In response thereto, the trained artificial neural network is configured to generate an estimate of a predicted degree of inhomogeneities in the milk.

The above quality sensor is advantageous because it truly enables prediction of a milk quality to be expected in a future milking, i.e. a not yet initiated milking of an animal. Hence, already from the start, any milk of suspected poor quality can be diverted. As a result, no substandard milk risks being fed into the bulk tank.

Further, it is straightforward to repeatedly update the trained artificial neural network, for example based on measurement data generated by the milking apparatus. Thereby, the precision of the quality sensor may gradually improve over time.

According to one embodiment of this aspect of the invention, the trained artificial neural network is of feedforward type, for instance a multi-layer perceptron network applying a sigmoid function as an activation function.

Preferably, the trained artificial neural network has weights that have been determined via a backpropagation training process involving scoring of densities of milk clot deposits on filters through which extracted milk has been passed during milk extraction processes in relation to training data expressing the set of input variables. Here, the scoring of the densities of milk clot deposits on the filters express output training data, i.e. to which degree the milk contains inhomogeneities in the form of so-called clots. Thereby, after adequate training, the trained artificial network captures relationships between the set of input variables and the inhomogeneities to be detected.

The scoring may be effected in various ways. According to one embodiment of this aspect of the invention, the scoring of densities of milk clot deposits on the filters is based on: a visual classification of the milk clot deposits made by a human assessor, e.g. a veterinarian or an animal scientist; an automatic image classification of the milk clot deposits performed by a computer-implemented algorithm; an electric impedance measurement on the filter, either when the milk clot deposits thereon are wet, dry or both; a wet weight of the milk clot deposits; a dry weight of the milk clot deposits; and/or an enzyme content in the milk clot deposits. Thus, a highly reliable basis for classifying the milk clot deposits can be obtained.

According to another embodiment of this aspect of the invention, the quality sensor contains an input interface configured to receive at least one input variable in the set of input variables from a milking apparatus used to extract milk from the animal. Naturally, the input variables received from the milking apparatus may originate from one or more earlier milkings as well as a current milking. Thereby, a large portion of the input variables may enter the quality sensor in a very convenient manner. Of course, this does not preclude parallel inputs of variables, i.e. from alternative sources and/or manual input. In any case, the input interface is preferably configured to convert and/or adapt one or more of the input variables before these are fed into the trained artificial neural network.

According to yet another embodiment of this aspect of the invention, the at least one characteristic reflecting the animal contains: at least one earlier estimate of a predicted degree of inhomogeneities generated by the trained artificial neural network in respect of the animal; a number of days in milk for the animal; an interval between consecutive milk extraction processes for the animal; and/or a parity number for the animal. Consequently, key animal aspects may be conveniently modelled by the trained artificial neural network.

According to still another embodiment of this aspect of the invention, the at least one characteristic reflecting the extracted milk contains: at least one udder quarter electric conductivity value registered during milk extraction from the animal; at least one mean udder quarter udder electric conductivity value for the animal determined based on milk extraction from the animal; a lactate dehydrogenase (LDH) measure for the animal; a parameter expressing a color of the milk extracted from the animal, either in at least one previous milking, the present, or both; a set of parameters expressing a respective color of the milk extracted from each udder quarter of the animal, either in at least one previous milking, the present, or both; and/or a somatic cell count in milk extracted from the animal. Thereby, key aspects of the milk may be conveniently modelled by the trained artificial neural network.

According to a further embodiment of this aspect of the invention, the at least one characteristic reflecting the process during which the milk was extracted contains: a duration of at least one milk extraction process for the animal, either at least one previous milking, the present, or both; a milk yield from the animal in at least one milk extraction process, either at least one previous milking, the present, or both; an expected milk yield from the animal in at least one milk extraction process, either at least one previous milking, the present, or both; a set of parameters expressing a respective expected milk yield from each udder quarter of the animal in at least one milk extraction process, either at least one previous milking, the present, or both; an expected rate of milk secretion in at least one milk extraction process for the animal, either at least one previous milking, the present, or both; a set of parameters expressing a respective expected rate of milk secretion from each udder quarter of the animal in at least one milk extraction process, either at least one previous milking, the present, or both; an udder quarter milk flow rate during a period of a milk extraction process for the animal, either at least one previous milking, the present, or both; a peak milk flow rate during at least one milk extraction process for the animal, either at least one previous milking, the present, or both; a set of parameters expressing a respective peak milk flow rate from each udder quarter of the animal in at least one milk extraction process, either at least one previous milking, the present, or both; an average udder quarter milk flow rate during at least one milk extraction process for the animal, either at least one previous milking, the present, or both; a set of parameters expressing a respective milk flow rate from each udder quarter of the animal during at least one milk extraction process, either at least one previous milking, the present, or both; a time required for attaching teatcups to the animal's teats in connection with at least one milk extraction process, either for at least one previous milking, the present, or both; an indication whether the animal has kicked off at least one teatcup in connection with at least one milk extraction process, either at least one previous milking, the present, or both; and/or an indication whether at least one udder quarter of the animal was not milked in at least one milk extraction process either at least one previous milking, the present, or both. Hence, key aspects of the milk extraction process may be conveniently modelled by the trained artificial neural network.

According to another aspect of the invention, the object is achieved by a computer-implemented method of predicting inhomogeneities in milk extracted from an animal. The method involves receiving a set of input variables reflecting at least one characteristic of the animal, as such; at least one characteristic of the milk extracted—in the present milking session, in at least one earlier milking session, or both; and at least one characteristic of at least one process during which milk was extracted from the animal—i.e. the present milking session, at least one earlier milking session, or both. The method further involves feeding the set of input variables into a trained artificial neural network; and in response thereto, generating an estimate of a predicted degree of inhomogeneities in the milk. The advantages of this method, as well as the preferred embodiments thereof are apparent from the discussion above with reference to the proposed control unit.

According to a further aspect of the invention, the object is achieved by a computer program loadable into a non-volatile data carrier communicatively connected to a processing unit. The computer program includes software for executing the above method when the program is run on the processing unit.

According to another aspect of the invention, the object is achieved by a non-volatile data carrier containing the above computer program.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

FIG. 2 shows a functional block diagram of a quality sensor according to one embodiment of the invention;

FIGS. 4*a-f* illustrate how filters may be employed for scoring different densities of milk clot deposits according to one embodiment of the invention; and FIG. 5 illustrates, by means of a flow diagram, the method according to a preferred embodiment of the invention.

DETAILED DESCRIPTION

Figure 1:
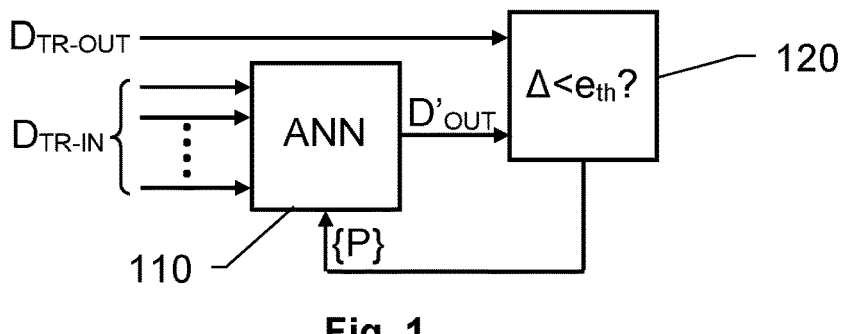
FIG. 1 schematically illustrates how an artificial neural network is trained according to one embodiment of the invention.

In FIG. 1, we see a setup for training an artificial neural network (ANN) 110 to be included in a quality sensor 200 according to the invention after that the ANN 110 has been trained.

FIG. 2 shows a functional block diagram of the quality sensor 200 according to one embodiment of the invention, which quality sensor 200 includes the trained ANN 210, i.e. a version of the ANN that has been modified via training as described below.

The setup of FIG. 1 includes an ANN 110, which initially is untrained, i.e. a network structure where a respective bias $b_1$, $b_2$, . . . , $b_n$ of each node/neuron has been randomly assigned and a respective weight $w_1$, . . . , $w_{ij}$ of each connection between the nodes/neurons has likewise been randomly assigned. The setup of FIG. 1 further includes an evaluation unit 120 configured to determine if an output $D'_{OUT}$ of the ANN 110 is sufficiently close to an actual output $D_{TR-OUT}$ that is linked to a set of training data $D_{IN-TR}$ fed into the ANN 110. Here, the ANN output $D'_{OUT}$ is a prediction of the actual output $D_{TR-OUT}$. Ideally, a difference A between the ANN output $D'_{OUT}$ and the actual output $D_{TR-OUT}$ should be "sufficiently small", however not zero. Namely, this may result in so-called overtraining and render the trained ANN 210 poorly suited to handle input data being only slightly different from the sets of training data $D_{IN-TR}$ used. If the difference A between the ANN output $D'_{OUT}$ and the actual output $D_{TR-OUT}$ is not yet "sufficiently small", i.e. the difference A is larger than an error threshold eth, the evaluation unit 120 is configured to generate a set of adjustment parameters {P}, which causes one or more of the weights $w_1$, . . . , $w_{ij}$ to be modified to a respective higher or lower value.

The ANN 110 is preferably of feedforward type, and may, in its most generic form, be implemented as a directed acyclic graph, i.e. a multilayer network where one or more edges skip layers. According to one embodiment of the invention, the ANN 110 is a standard multilayer perceptron (MLP) network including an input layer IL, a single hidden layer HL and an output layer OL. Naturally, any higher number than one hidden layers HLs is likewise conceivable according to the invention.

Preferably, if the ANN 110 is arranged to generate a binary output 0 or 1 respectively via the output layer OL, the ANN 110 is configured to apply a sigmoid activation function, where a resulting value larger than or equal to 0.5 produces the output 1 and a resulting value smaller than 0.5 produces the output 0. This corresponds to an estimate $D_{OUT}$ of a predicted degree of inhomogeneities in the milk, where 0 represents no inhomogeneities/clots in the milk and 1 represents the occurrence of inhomogeneities/clots in the milk.

However, as will be discussed below, according to the invention, estimates $D_{OUT}$ in any form of multi-level outputs from the ANN are equally well conceivable, i.e. more nuanced estimates of the predicted degree of inhomogeneities in the milk.

In addition, the estimate $D_{OUT}$ generated by the ANN may be a vector containing a plurality of variables, for example one variable per udder quarter. Thus, the output from the ANN may have a format {Y1,Y2,Y3,Y4}, where Y1 designates a predicted degree of inhomogeneities in the milk from a first udder quarter, Y2 designates a predicted degree of inhomogeneities in the milk from a second udder quarter, Y3 designates a predicted degree of inhomogeneities in the milk from a third udder quarter and Y4 designates a predicted degree of inhomogeneities in the milk from a fourth udder quarter. For example, here, an output {0,0,1,0} could represent inhomogeneities/clots in the milk from the third udder quarter and no inhomogeneities/clots in the milk from the other udder quarters. Naturally, according to the invention such a vector-format output may also be combined with a multi-level output per variable.

According to the invention, the ANN 110 is trained with training data $D_{TR-IN}$ reflecting a set of variables of the same type as a set of input variables $D_{IN}$ that will be fed to the trained ANN 210 included in the quality sensor 200 during operation thereof.

Referring now to FIGS. 4*a* to 4*f*, we see illustrations of how a filter 410 may be employed according to one embodiment of the invention to score inhomogeneities in the form different densities of milk clot deposits. According to one embodiment of the invention, the trained artificial neural network 210 of the quality sensor 200 has weights $w_i$, . . . , $w_{ij}$ that have been determined via a backpropagation training process involving scoring of different densities of milk clots on the filter 410. The filter 410 is mounted in a frame 400, which, in turn, is placed in a holder in a milk conduit where milk is transported in such a manner that extracted milk passes through the filter 410 during a milk extraction process. For example, the holder for the filter 410 may be arranged along a milk tube, preferably before a respective milk meter of each teat cup.

FIGS. 4*a* to 4*f* show the filter 410 after that extracted milk with different degrees of inhomogeneities has been passed through the filter 410.

In FIG. 4*a*, there is no sign of clots on the filter 410. The extracted milk is therefore assigned a scoring SC0 designating no clots. In FIG. 4*b*, a fraction of a clot 411 is identified on the filter 410, and the extracted milk is assigned a scoring SC1 designating a lowest level of inhomogeneities being present in the milk. For example, the scoring SC1 may represent an aggregate area of deposits on the filter 410 equivalent to a single clot having a diameter smaller than 3 mm.

In FIG. 4*c*, a mild amount of clots 412 is identified on the filter 410, and the extracted milk is assigned a scoring SC2 designating a second lowest level of inhomogeneities being present in the milk. For example, the scoring SC2 may represent an aggregate area of deposits on the filter 410 equivalent to a single clot having a diameter larger than 3 mm and smaller than 5 mm.

In FIG. 4*d*, a moderate amount of clots 413 is identified on the filter 410, and the extracted milk is assigned a scoring SC3 designating a third lowest level of inhomogeneities being present in the milk. For example, the scoring SC3 may represent an aggregate area of deposits on the filter 410 equivalent to a single clot having a diameter larger than 5 mm and covering less than or equal to 10% of a total area of the filter 410.

In FIG. 4e, the filter 410 contains a heavy amount of clots 414, and the extracted milk is assigned a scoring SC4 designating a second highest level of inhomogeneities being present in the milk, which is above the third lowest level. For example, the scoring SC4 may represent an aggregate area of deposits on the filter 410 covering more than 10% and less than 50% of the total area of the filter 410.

In FIG. 4f, the filter 410 contains a very heavy assemble of clots 415, and the extracted milk is assigned a scoring SC5 designating a highest level of inhomogeneities being present in the milk. For example, the scoring SC5 may represent an aggregate area of deposits on the filter 410 covering more than 50% of the total area of the filter 410.

For each set of training data $D_{IN\text{-}TR}$, a respective scoring SC0, SC1, SC2, SC3, SC4 or SC5 is associated to express output training data $D_{TR\text{-}OUT}$ linked thereto. Based on this, the ANN 110 is trained as described above such that it is transformed into the trained ANN 210.

The scorings SC0, SC1, SC2, SC3, SC4 or SC5, in turn, may be derived in various ways. According to one embodiment of the invention, a particular scoring SC0, SC1, SC2, SC3, SC4 or SC5 of a density of milk clot deposits 411, 412, 413, 414 and 415 respectively on the filter 410 is based on one or more of the following:

a visual classification of the milk clot deposits 411, 412, 413, 414 and 415 respectively made by at least one human assessor, for example a veterinarian, an automatic image classification of the milk clot deposits 411, 412, 413, 414 and 415 respectively performed by a computer-implemented algorithm, for instance based on artificial intelligence (AI), an electric impedance measurement on the filter 410 when the milk clot deposits 411, 412, 413, 414 and 415 respectively are wet, an electric impedance measurement on the filter 410 when the milk clot deposits 411, 412, 413, 414 and 415 respectively are dry, a wet weight of the milk clot deposits 411, 412, 413, 414 and 415 respectively, a dry weight of the milk clot deposits 411, 412, 413, 414 and 415 respectively, and an enzyme content in the milk clot deposits 411, 412, 413, 414 and 415 respectively, which enzyme content may indicate an amount of leukocytes.

According to the invention, the set of training data $D_{IN\text{-}TR}$ reflects at least one characteristic of the animal whose milk is to serve as a basis for training the ANN 110 in relation to the output training data $D_{TR\text{-}OUT}$ expressed by the scorings SC0, SC1, SC2, SC3, SC4 and SC5.

According to the invention, the set of training data $D_{IN\text{-}TR}$ also reflects at least one characteristic of the extracted milk serving as a basis for training the ANN 110 in relation to the output training data $D_{TR\text{-}OUT}$ expressed by the scorings SC0, SC1, SC2, SC3, SC4 and SC5.

Additionally, according to the invention, the set of training data $D_{IN\text{-}TR}$ reflects at least one characteristic of at least one process during which milk was extracted from the animal serving as a basis for training the ANN 110 in relation to the output training data $D_{TR\text{-}OUT}$ expressed by the scorings SC0, SC1, SC2, SC3, SC4 and SC5.

The set of training data $D_{IN\text{-}TR}$ consequently reflects the same type of variables as the set of input variables $D_{IN}$ that will be fed to the trained ANN 210 included in the quality sensor 200 to generate an estimate $D_{OUT}$ of a predicted degree of inhomogeneities in the milk.

The at least one characteristic of the animal in the set of training data $D_{IN\text{-}TR}$ has been registered before the milking is initiated based upon which the scorings SC0, SC1, SC2, SC3, SC4 and SC5 are assigned. The at least one characteristic of the animal in the set of training data $D_{IN\text{-}TR}$ may, according to embodiments of the invention relate to: a number of days in milk for the animal, an interval between consecutive milk extraction processes for the animal and/or a parity number for the animal.

The at least one characteristic of the extracted milk in the set of training data $D_{IN\text{-}TR}$ may either have been registered before the milking is initiated, and thus relate to one or more earlier milkings, and/or be registered during the milking based upon which the scorings SC0, SC1, SC2, SC3, SC4 and SC5 are assigned. According to embodiments of the invention, the at least one characteristic of the extracted milk may relate to: at least one udder quarter electric conductivity value registered during milk extraction from the animal, at least one mean udder quarter electric conductivity value for the animal determined based on milk extraction from the animal, an LDH measure for the animal, a parameter expressing a color of the milk extracted from the animal, a set of parameters expressing a respective color of the milk extracted from each udder quarter of the animal, and/or a somatic cell count in milk extracted from the animal.

Analogously, the at least one characteristic of at least one process during which milk was extracted from the animal included in the set of training data $D_{IN\text{-}TR}$ may either have been registered before the milking is initiated, and thus relate to one or more earlier milkings, and/or be registered during the milking based upon which the scorings SC0, SC1, SC2, SC3, SC4 and SC5 are assigned. According to embodiments of the invention, the at least one characteristic of at least one process during which milk was extracted from the animal may relate to: a duration of at least one milk extraction process for the animal, a milk yield from the animal in at least one milk extraction process, an expected milk yield from the animal in at least one milk extraction process, a set of parameters expressing a respective expected milk yield from each udder quarter of the animal in at least one milk extraction process, an expected rate of milk secretion in at least one milk extraction process for the animal, a set of parameters expressing a respective expected rate of milk secretion from each udder quarter of the animal in at least one milk extraction process, an udder quarter milk flow rate during a period of a milk extraction process for the animal, a peak milk flow rate during at least one milk extraction process for the animal, a set of parameters expressing a respective peak milk flow rate from each udder quarter of the animal in at least one milk extraction process, an average udder quarter milk flow rate during at least one milk extraction process for the animal, a set of parameters expressing a respective milk flow rate from each udder quarter of the animal during at least one milk extraction process, a time required for attaching teatcups to the animal's teats in connection with at least one milk extraction process, an indication whether the animal has kicked off at least one teatcup in connection with at least one milk extraction process, and/or an indication whether at least one udder quarter of the animal was not milked in at least one milk extraction process.

Before entering the set of training data $D_{IN\text{-}TR}$ into the ANN 110, it may be necessary to adjust and/or transform one or more pieces of data in order to render the data useful for training. For example, numerical variables may need to be normalized. Furthermore, one or more variables may need to be transferred to the logarithmic domain.

Similarly, this type of adjustments and/or transformations may be needed when operating the quality sensor 200 and receiving the set of input variables $D_{IN}$. Therefore, the quality sensor 200 preferably contains an input interface 205 configured to adjust and/or transform at least one variable in the set of input variables $D_{IN}$ before feeding the set of input variables $D_{IN}$ into the trained artificial neural network 210.

According to the invention, in operation, the quality sensor 200 is configured to receive the set of input variables $D_{IN}$, which reflect at least one characteristic of the animal to be milked, that is being milked; at least one characteristic of the extracted milk, and at least one characteristic of at least process during which milk was extracted from the animal, either in the present milking, in at least one previous milking, or both.

The quality sensor 200 is further configured to feed the set of input variables $D_{IN}$ into the trained ANN 210. In response thereto, the trained ANN 210 is configured to generate an estimate $D_{OUT}$ of a predicted degree of inhomogeneities in the milk, for example as a first output 0 representing no inhomogeneities/no clots, and a second output 1 representing an occurrence of inhomogeneities/clots.

Here, the scores SC0, SC1 and SC2 may for example be translated into the first output 0, and the scores SC3, SC4 and SC5 may be translated into the second output 1. However, technically, any other translation scheme is possible according to the invention. It is also feasible to generate an estimate $D_{OUT}$ of the predicted degree of inhomogeneities in the milk that reflects three or more different degrees of inhomogeneities, say one degree corresponding to each of the six levels represented by the scores SC0, SC1, SC2, SC3, SC4 and SC5 respectively. Nevertheless, in practice, a binary output is deemed to be the most useful tool to determine whether or not the milk fulfills a particular quality standard.

According to one embodiment of the invention, the quality sensor 200 contains the above input interface 205, which is further configured to receive at least one input variable in the set of input variables $D_{IN}$ from the milking apparatus that was used to extract the milk from the animal.

Moreover, the quality sensor 200 may contain an output interface 215 configured to provide the estimate $D_{OUT}$ to external units and/or present the estimate $D_{OUT}$ to a human operator.

Figure 3:
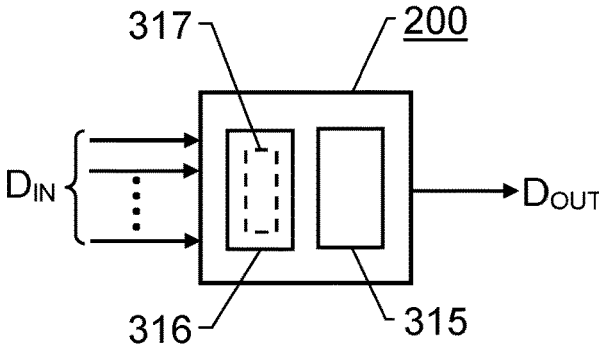
FIG. 3 shows a structural block diagram of the quality sensor according to one embodiment of the invention.

FIG. 3 shows a block diagram of the quality sensor 200 according to one embodiment of the invention. It is generally advantageous if the quality sensor 200 is configured to effect the above-described procedure in an automatic manner by executing a computer program 317. Therefore, the quality sensor 200 may include a memory unit 316, i.e. non-volatile data carrier, storing the computer program 317, which, in turn, contains software for making processing circuitry in the form of at least one processor 315 in the quality sensor 200 execute the actions mentioned in this disclosure when the computer program 317 is run on the at least one processor 315.

In order to sum up, and with reference to the flow diagram in FIG. 5, we will now describe the computer-implemented method according to the invention of predicting inhomogeneities in milk extracted from an animal.

A first step 510, checks if a set of input variables $D_{IN}$ has been received. The set of input variables $D_{IN}$ reflects at least one characteristic of the animal, at least one characteristic of the extracted milk, and at least one characteristic of at least one process during which milk was extracted from the animal.

The at least one characteristic of the animal has been registered before the milking is initiated, and may, according to embodiments of the invention relate to: at least one earlier estimate of predicted inhomogeneities in milk extracted from the animal generated by the trained artificial neural network, a number of days in milk for the animal, an interval between consecutive milk extraction processes for the animal, and/or a parity number for the animal.

The at least one characteristic of the extracted milk may either have been registered before the milking is initiated, and thus relate to one or more earlier milkings, and/or be registered during the milking in which the inhomogeneities are to be predicted. According to embodiments of the invention, the at least one characteristic of the extracted milk may relate to: at least one udder quarter electric conductivity value registered during milk extraction from the animal, at least one mean udder quarter electric conductivity value for the animal determined based on milk extraction from the animal, an LDH measure for the animal, a parameter expressing a color of the milk extracted from the animal, a set of parameters expressing a respective color of the milk extracted from each udder quarter of the animal, and/or a somatic cell count in milk extracted from the animal.

Analogous to the above, the at least one characteristic of at least one process during which milk was extracted from the animal may either have been registered before the milking is initiated, and thus relate to one or more earlier milkings, and/or be registered during the milking in which the inhomogeneities are to be predicted. According to embodiments of the invention, the at least one characteristic of at least one process during which milk was extracted from the animal may relate to: a duration of at least one milk extraction process for the animal, a milk yield from the animal in at least one milk extraction process, an expected milk yield from the animal in at least one milk extraction process, a set of parameters expressing a respective expected milk yield from each udder quarter of the animal in at least one milk extraction process, an expected rate of milk secretion in at least one milk extraction process for the animal, a set of parameters expressing a respective expected rate of milk secretion from each udder quarter of the animal in at least one milk extraction process, an udder quarter milk flow rate during a period of a milk extraction process for the animal, a peak milk flow rate during at least one milk extraction process for the animal, a set of parameters expressing a respective peak milk flow rate from each udder quarter of the animal in at least one milk extraction process, an average udder quarter milk flow rate during at least one milk extraction process for the animal, a set of parameters expressing a respective milk flow rate from each udder quarter of the animal during at least one milk extraction process, a time required for attaching teatcups to the animal's teats in connection with at least one milk extraction process, an indication whether the animal has kicked off at least one teatcup in connection with at least one milk extraction process, and/or an indication whether at least one udder quarter of the animal was not milked in at least one milk extraction process.

If, in step 510, it is found that the set of input variables $D_{IN}$ has been received, a step 520 follows. Otherwise, the procedure loops back and stays in step 510.

In step 520, the set of input variables $D_{IN}$ is fed into the above-described trained artificial neural network.

Subsequently, in response the set of input variables $D_{IN}$ the trained artificial neural network generates an estimate $D_{OUT}$ of a predicted degree of inhomogeneities in the milk in a step 530.

Thereafter, the procedure ends.

All of the process steps, as well as any sub-sequence of steps, described with reference to FIG. 5 may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal, which may be conveyed, directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

Variations to the disclosed embodiments can be understood and effected by those skilled in the art in practicing the claimed invention, from a study of the drawings, the disclosure, and the appended claims.

The term "comprises/comprising" when used in this specification is taken to specify the presence of stated features, integers, steps or components. The term does not preclude the presence or addition of one or more additional elements, features, integers, steps or components or groups thereof. The indefinite article "a" or "an" does not exclude a plurality. In the claims, the word "or" is not to be interpreted as an exclusive or (sometimes referred to as "XOR"). On the contrary, expressions such as "A or B" covers all the cases "A and not B", "B and not A" and "A and B", unless otherwise indicated. The mere fact that certain measures are recited in mutually different dependent claims does not indicate that a combination of these measures cannot be used to advantage. Any reference signs in the claims should not be construed as limiting the scope.

It is also to be noted that features from the various embodiments described herein may freely be combined, unless it is explicitly stated that such a combination would be unsuitable.

The invention is not restricted to the described embodiments in the figures, but may be varied freely within the scope of the claims.

The invention claimed is:

1. A quality sensor (200) for predicting inhomogeneities in milk extracted during an extraction process, the quality sensor (200) comprising:

a processor, in communication with a memory, an input interface, and an output interface, the processor being configured to implement a trained artificial neural network, and further configured to:

receive a set of input variables ($D_{IN}$) via the input interface, the input variables ($D_{IN}$) reflecting:

at least one characteristic of an animal, at least one characteristic of milk extracted from the animal, and at least one characteristic of at least one process during which the milk was extracted from the animal;

feed the set of input variables ($D_{IN}$) into the trained artificial neural network (210); and generate and output, from the trained artificial neural network (210) operating on the set of input variables, an estimate ($D_{OUT}$) of a predicted degree of inhomogeneities in the milk of the animal, wherein the trained artificial neural network (210) has weights that have been determined via a backpropagation training process comprised of a scoring of densities of milk clot deposits on filters (410) through which extracted milk has been passed during milk extraction processes in relation to training data ($D_{TR-IN}$) expressing the set of input variables, the scoring of the densities of milk clot deposits on the filters (410) expressing output training data ($D_{TR-OUT}$).

2. The quality sensor (200) according to claim 1, wherein the trained artificial neural network (210) is a feedforward neural network.

3. The quality sensor (200) according to claim 1, wherein the scoring of densities of milk clot deposits on the filters (410) is based on at least one of:

a visual classification of the milk clot deposits by a human assessor, an automatic image classification of the milk clot deposits by a computer-implemented algorithm, an electric impedance measurement on the filter (410) when the milk clot deposits are wet, an electric impedance measurement on the filter (410) when the milk clot deposits are dry, a wet weight of the milk clot deposits, a dry weight of the milk clot deposits, and an enzyme content in the milk clot deposits.

4. The quality sensor (200) according to claim 1, wherein the processor is configured to receive via the input interface at least one input variable of the set of input variables ($D_{IN}$) from a milking apparatus used to extract milk from the animal.

5. The quality sensor (200) according to claim 1, wherein the at least one characteristic reflecting the animal comprises at least one of:

at least one earlier estimate ($D_{OUT}$) generated by the trained artificial neural network (210) with respect to the animal, a number of days in milk for the animal, an interval between consecutive milk extraction processes for the animal, and a parity number for the animal.

6. The quality sensor (200) according to claim 1, wherein the at least one characteristic reflecting the extracted milk comprises at least one of:

at least one udder quarter electric conductivity value registered during milk extraction from the animal, at least one mean udder quarter electric conductivity value for the animal determined based on milk extraction from the animal, a lactate dehydrogenase measure for the animal,

a parameter expressing a color of the milk extracted from the animal, a set of parameters expressing a respective color of the milk extracted from each udder quarter of the animal, and a somatic cell count in milk extracted from the animal.

7. The quality sensor (200) according to claim 1, wherein the at least one characteristic reflecting the process during which the milk was extracted comprises at least one of:

a duration of at least one milk extraction process for the animal, a milk yield from the animal in at least one milk extraction process, an expected milk yield from the animal in at least one milk extraction process, a set of parameters expressing a respective expected milk yield from each udder quarter of the animal in at least one milk extraction process, an expected rate of milk secretion in at least one milk extraction process for the animal, a set of parameters expressing a respective expected rate of milk secretion from each udder quarter of the animal in at least one milk extraction process, an udder quarter milk flow rate during a period of a milk extraction process for the animal, a peak milk flow rate during at least one milk extraction process for the animal, a set of parameters expressing a respective peak milk flow rate from each udder quarter of the animal in at least one milk extraction process, an average udder quarter milk flow rate during at least one milk extraction process for the animal, a set of parameters expressing a respective milk flow rate from each udder quarter of the animal during at least one milk extraction process, a time required for attaching teatcups to the animal's teats in connection with at least one milk extraction process, an indication whether the animal has kicked off at least one teatcup in connection with at least one milk extraction process, and an indication whether at least one udder quarter of the animal was not milked in at least one milk extraction process.

8. A method, performed by a computer programmed to implement a trained artificial neural network, for predicting inhomogeneities in milk that is extracted during an extraction process, the method comprising:

receiving a set of input variables ($D_{IN}$) from an input interface of the computer, the input variables ($D_{IN}$) reflecting at least one characteristic of an animal, at least one characteristic of milk extracted from the animal, and at least one characteristic of at least one process during which the milk was extracted from the animal;

feeding the set of input variables ($D_{IN}$) into the trained artificial neural network (210); and generating and outputting, from the trained artificial neural network (210) operating on the set of input variables, an estimate ($D_{OUT}$) of a predicted degree of inhomogeneities in the milk of the animal, wherein the trained artificial neural network (210) has weights that have been determined via a backpropagation training process comprised of a scoring of densities of milk clot deposits on filters (410) through which extracted milk has been passed during milk extraction processes in relation to training data ($D_{TR-IN}$) expressing the set of input variables, the scoring of the densities of milk clot deposits on the filters (410) expressing output training data ($D_{TR-OUT}$).

9. The method according to claim 8, wherein the trained artificial neural network (210) is a feedforward neural network.

10. The method according to claim 8, wherein the scoring of the densities of milk clot deposits on the filters (410) is based on at least one of:

a visual classification of the milk clot deposits by a human assessor, an automatic image classification of the milk clot deposits by a computer-implemented algorithm, an electric impedance measurement on the filter when the milk clot deposits are wet, an electric impedance measurement on the filter when the milk clot deposits are dry, a wet weight of the milk clot deposits, a dry weight of the milk clot deposits, and an enzyme content in the milk clot deposits.

11. The method according to claim 8, further comprising:

receiving at least one input variable of the set of input variables ($D_{IN}$) from a milking apparatus used to extract milk from the animal.

12. The method according to claim 8, wherein the at least one characteristic reflecting the animal comprises at least one of:

at least one earlier an estimate ($D_{OUT}$) generated by the trained artificial neural network (210) with respect to the animal, a number of days in milk for the animal, an interval between consecutive milk extraction processes for the animal, and a parity number for the animal.

13. The method according to claim 8, wherein the at least one characteristic reflecting the extracted milk comprises at least one of:

at least one udder quarter electric conductivity value registered during milk extraction from the animal, at least one mean udder quarter electric conductivity value for the animal determined based on milk extraction from the animal, a lactate dehydrogenase measure for the animal, a parameter expressing a color of the milk extracted from the animal, a set of parameters expressing a respective color of the milk extracted from each udder quarter of the animal, and a somatic cell count in milk extracted from the animal.

14. The method according to claim 8, wherein the at least one characteristic reflecting the process during which the milk was extracted comprises at least one of:

a duration of at least one milk extraction process for the animal, a milk yield from the animal in at least one milk extraction process, an expected milk yield from the animal in at least one milk extraction process, a set of parameters expressing a respective expected milk yield from each udder quarter of the animal in at least one milk extraction process, an expected rate of milk secretion in at least one milk extraction process for the animal, a set of parameters expressing a respective expected rate of milk secretion from each udder quarter of the animal in at least one milk extraction process, an udder quarter milk flow rate during a period of a milk extraction process for the animal, a peak milk flow rate during at least one milk extraction process for the animal, a set of parameters expressing a respective peak milk flow rate from each udder quarter of the animal in at least one milk extraction process, an average udder quarter milk flow rate during at least one milk extraction process for the animal, a set of parameters expressing a respective milk flow rate from each udder quarter of the animal during at least one milk extraction process, a time required for attaching teatcups to the animal's teats in connection with at least one milk extraction process, an indication whether the animal has kicked off at least one teatcup in connection with at least one milk extraction process, and an indication whether at least one udder quarter of the animal was not milked in at least one milk extraction process.

15. A non-volatile, non-transitory data carrier (316) having stored thereon a computer program (317) readable by a processor (315), the computer program (317) comprising software that causes the processor (315) to execute the method according to claim 8 upon execution of the computer program (317) by the processor (315).

\* \* \* \* \*